(12) United States Patent
Ozmen et al.

(10) Patent No.: US 11,724,240 B2
(45) Date of Patent: Aug. 15, 2023

(54) REGENERATION VESSEL ADSORPTION ZONE AND PROCESS FOR ADSORBING HALOGEN-CONTAINING MATERIAL AND SAMPLING CATALYST

(71) Applicant: UOP LLC, Des Plaines, IL (US)

(72) Inventors: Jennifer J. Ozmen, Wilmette, IL (US); Rebecca Mudrock, Wauconda, IL (US); Bryan K. Glover, Arlington Heights, IL (US); Hosoo Lim, Mount Prospect, IL (US); Joel S. Paustian, Vernon Hills, IL (US)

(73) Assignee: UOP LLC, Des Plaines, IL (US)

( * ) Notice: Subject to any disclaimer, the term of this patent is extended or adjusted under 35 U.S.C. 154(b) by 225 days.

(21) Appl. No.: 17/139,616

(22) Filed: Dec. 31, 2020

(65) Prior Publication Data

US 2022/0203319 A1  Jun. 30, 2022

(51) Int. Cl.
*B01J 8/26* (2006.01)
*B01J 8/18* (2006.01)
(Continued)

(52) U.S. Cl.
CPC ............ *B01J 8/26* (2013.01); *B01D 53/8659* (2013.01); *B01D 53/88* (2013.01); *B01J 8/001* (2013.01);
(Continued)

(58) Field of Classification Search
CPC . B01J 8/001; B01J 8/003; B01J 8/1827; B01J 8/1881; B01J 8/26;
(Continued)

(56) References Cited

U.S. PATENT DOCUMENTS

| 5,837,636 A | 11/1998 | Sechrist et al. |
| 6,034,018 A | 3/2000 | Sechrist et al. |

(Continued)

FOREIGN PATENT DOCUMENTS

| CN | 101569830 A | 11/2009 |
| CN | 205517127 U | 8/2016 |
| EP | 0872276 A1 | 10/1998 |

OTHER PUBLICATIONS

Machine translation of Sun et al, CN 107008512, published Aug. 4, 2017.*

(Continued)

*Primary Examiner* — Brian A McCaig (57) ABSTRACT

A regenerator vessel for adsorbing halogen-containing material from a regenerator vent gas stream has a plurality of catalyst nozzles disposed at a top portion of the regenerator vessel. A first gas outlet is associated with a chlorination zone, and a second gas outlet associated with a combustion zone. A drying zone is in fluid communication with an air heater and the drying zone located in a bottom portion of the regenerator vessel. The first gas outlet is configured to withdraw a first gas stream from the chlorination zone and the second gas outlet is configured to withdraw a second gas stream from the combustion zone. The top portion of the regenerator vessel has an adsorption zone having a vent gas inlet port, a vent gas outlet port, and a portion of an annular catalyst bed.

20 Claims, 9 Drawing Sheets

(51) Int. Cl.
*B01J 8/00* (2006.01)
*B01J 38/44* (2006.01)
*G01N 1/04* (2006.01)
*B01D 53/88* (2006.01)
*B01D 53/86* (2006.01)

(52) U.S. Cl.
CPC ............ *B01J 8/003* (2013.01); *B01J 8/1827* (2013.01); *B01J 8/1881* (2013.01); *B01J 38/44* (2013.01); *G01N 1/04* (2013.01); *B01D 2257/2025* (2013.01); *B01D 2257/2027* (2013.01); *B01D 2257/2045* (2013.01); *B01D 2258/0283* (2013.01); *B01J 2208/00654* (2013.01); *B01J 2208/00752* (2013.01); *B01J 2208/00761* (2013.01)

(58) Field of Classification Search
CPC .... B01J 2208/00654; B01J 2208/00752; B01J 2208/00761; B01J 38/02; B01J 38/42; B01J 38/44; B01J 27/10; B01J 27/12; B01J 27/32; B01D 53/8659; B01D 53/88; B01D 2257/2025; B01D 2257/2027; B01D 2257/2045; B01D 2258/0283; G01N 1/04

See application file for complete search history.

(56) References Cited

U.S. PATENT DOCUMENTS

| | | | |
|---|---|---|---|
| 6,153,091 | A | 11/2000 | Sechrist et al. |
| 6,461,992 | B1 | 10/2002 | Sechrist et al. |
| 7,745,364 | B2 | 6/2010 | Fecteau et al. |
| 8,173,567 | B2 | 5/2012 | Palmas et al. |
| 2016/0175775 | A1* | 6/2016 | Sadler .................. B01D 53/02 95/115 |

OTHER PUBLICATIONS

International Search Report from corresponding PCT application No. PCT/US2021/073082, dated Apr. 7, 2022.
Written Opinion from corresponding PCT application No. PCT/US2021/073082, dated Apr. 7, 2022.

* cited by examiner

REGENERATION VESSEL ADSORPTION ZONE AND PROCESS FOR ADSORBING HALOGEN-CONTAINING MATERIAL AND SAMPLING CATALYST

FIELD OF THE INVENTION

This invention relates to the treatment of vent gas in platforming reactors and sampling catalyst of the same.

BACKGROUND OF THE INVENTION

In platforming reactors, catalyst is used to promote hydrocarbon conversion reactions. As the catalyst is utilized, it becomes deactivated due to various factors. To re-activate the catalyst, it is moved to a continuous regeneration system. The regeneration process includes removing coke from catalyst by burning, redispersion of metals such as platinum and catalytic promoters such as chlorides on the catalyst, and drying catalyst. To replenish chlorides, a chlorination-containing species is introduced in the regeneration system, resulting in a flue gas stream known as vent gas which contains hydrogen chloride (HCl). Due to environmental regulations, halogen-containing materials, such as HCl, must be treated or removed before the vent gas is released to the atmosphere.

Currently there are various atmospheric-style regeneration system designs in existence, and many do not have a method for treating vent gas. Often such systems use caustic scrubbers to do so. Due to tightened regulations, many atmospheric-style regeneration systems operating without vent gas treatment systems will require the addition of a vent gas treatment system.

One option to remove halogen-containing materials is by cooling a portion of the regeneration vent gas and contacting it with spent catalyst in an adsorption zone where HCl is adsorbed onto the catalyst. Such systems were developed and marketed by Universal Oil Products (UOP) and are known as the Chlorsorb™ process. The benefits of this process are that the vent gas is treated without caustic and there is a reduction in additional chloride required for the catalyst regeneration process.

Current options for retrofitting an existing regeneration system to adsorb hydrogen chloride from regeneration vent gas include the following: a standalone adsorption unit, an absorption unit integrated in a disengaging hopper, or vent gas treating systems. A standalone system may have higher expenses compared to other vent gas treating systems and would likely require plot space. An adsorption inside a catalyst disengaging hopper could involve major structural modifications and may take longer time to implement as it may require a longer equipment shutdown time. Vent gas wash towers use caustic, which is severely corrosive. Use of caustics leads to high waste disposal costs.

At various points in the platforming process, it is necessary to take samples of the catalyst to check for certain properties throughout the regeneration process. Specifically, in units with the Chlorsorb™ process, it is necessary to check the catalyst at the outlet of the adsorption bed for proper chloride absorption to ensure that the vent gas has been treated properly and to comply with EPA regulations. A standard, gravity flow catalyst sample design would typically be used. Such a design utilizes a downward slope (typically 45-degree angle) below the catalyst bed to allow for gravity flow of catalyst to the collection point. However, this design is limited in that it requires a significant amount of space below the catalyst bed to fit the nozzle, valves, and collection equipment. In locations where there is not a lot of space below where the sample needs to be taken, there are few options other than increasing the elevation of the equipment, which is not desirable and may not be possible for revamps where the structure is existing. Other methods using pressure differentials to remove catalyst are significantly more complicated and could negatively impact the hydraulics within the catalyst bed/vessel. Furthermore, they also require additional piping and more space external to the vessel. A simple, yet robust solution is needed that would allow for a catalyst sample where the nozzle and collection equipment are located at the same elevation or above the catalyst sample point.

SUMMARY

The present invention provides a new system for adsorbing halogen-containing materials in a regenerator vessel.

Therefore, the present invention may be characterized, in at least one aspect, as providing a regenerator vessel for adsorbing halogen-containing material from a regenerator vent gas stream, the regenerator vessel comprising: a plurality of catalyst nozzles disposed at a top portion of the regenerator vessel; a first gas outlet associated with a chlorination zone; a second gas outlet associated with a combustion zone; and a drying zone in fluid communication with an air heater, the drying zone located in a bottom portion of the regenerator vessel; wherein the first gas outlet is configured to withdraw a first gas stream from the chlorination zone; wherein the second gas outlet is configured to withdraw a second gas stream from the combustion zone; wherein the top portion of the regenerator vessel comprises an adsorption zone having a vent gas inlet port and a vent gas outlet port, the adsorption zone comprising a portion of an annular catalyst bed.

A second aspect of the invention is a process for regenerating catalyst in a regenerator vessel, the process comprising: providing the regenerator vessel comprising: a plurality of catalyst nozzles disposed at a top portion of the regenerator vessel; a first gas outlet associated with a chlorination zone; a second gas outlet associated with a combustion zone; and a drying zone in fluid communication with an air heater located in a bottom portion of the regenerator vessel; wherein the first gas outlet is configured to withdraw a first gas stream from the chlorination zone; wherein the second gas outlet is configured to withdraw a second gas stream from the combustion zone; withdrawing a portion of the second gas stream to form a regenerator vent gas stream; introducing the regenerator vent gas stream to the top portion of the regenerator vessel at a vent gas inlet port; contacting the regenerator vent gas stream with catalyst in the top portion of the regenerator vessel; withdrawing a treated regenerator vent gas stream from the top portion of the regenerator vessel at a vent gas outlet port; and discharging the treated regenerator vent gas stream to the atmosphere.

A third aspect of the invention is a method of retrofitting a head portion of a regenerator vessel, the method comprising: unloading catalyst from the regenerator vessel; disconnecting piping associated with the head portion, the piping comprising a chlorination zone outlet, a burn zone outlet, and catalyst transfer piping; removing the head portion and a portion of an inner screen; installing a new head portion having a vent gas inlet port, a vent gas outlet port, an annular outer baffle, and an annular inner baffle; connecting a vent gas inlet line, a vent gas outlet line, a vent gas cooler, an air preheater, to the new head portion; and reloading catalyst into the regenerator vessel.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures.

DEFINITIONS

As used herein, the term "zone" can refer to an area including one or more equipment items and/or one or more sub-zones. Additionally, an equipment item, such as a reactor or vessel, can further include one or more zones or sub-zones.

As used herein, the term "adsorption" can refer to the retention of a material in a bed containing an adsorbent by any chemical or physical interaction between a material, such as a halogen-containing material, in the bed, and includes, but is not limited to, adsorption, and/or absorption. The removal of the material from an adsorbent, is referred to herein as "desorption."

As used herein, the term "halogen-containing material" can include a halogen molecule, such as chlorine or fluorine, or a compound containing one or more independent halogen radicals. Examples of a halogen-containing material can include chlorine, fluorine, and hydrogen chloride.

As used herein, the term "buffer" or "bubble" generally refers to an inert gas, such as nitrogen, introduced into a region to create a volume of slightly higher pressure to prevent the intermingling of gases from respective first and second atmospheres.

DETAILED DESCRIPTION OF THE INVENTION

Before referencing the drawing figures, a process for regenerating a hydrocarbon conversion catalyst can include a reforming reaction zone, a catalyst regeneration zone, and lines and equipment communicating with these zones as disclosed in e.g., U.S. Pat. No. 6,034,018 (Sechrist et al.), U.S. Pat. No. 7,745,364 (Fecteau et al.), which are hereby incorporated by reference in their entirety. So, these zones are described schematically in the context of the present embodiments.

Also as discussed hereinafter in reference to the drawing figures, more than one embodiment is depicted in a refinery or a petrochemical production facility to conserve drawing figures. However, it should be understood that a refinery or a petrochemical production facility can include only one of these embodiments or can include two or more in combination.

The systems and processes disclosed herein can be applicable to a wide range of catalytic hydrocarbon conversion processes including aromatic isomerization, paraffin or olefin isomerization, paraffin dehydrogenation, alkylation, and the regeneration of the catalyst. Hydrocarbon conversion processes may include reforming, alkylating, dealkylating, hydrogenating, hydrotreating, dehydrogenating, isomerizing, dehydroisomerizing, dehydrocyclizing, cracking, or hydrocracking. The exemplary embodiment depicted herein can be a reforming process.

Flue gas streams from regeneration units of such processes typically contain a halogen-containing material such as halides, particularly chlorides, which can require removal if the streams are discharged to the atmosphere.

Figure 1:
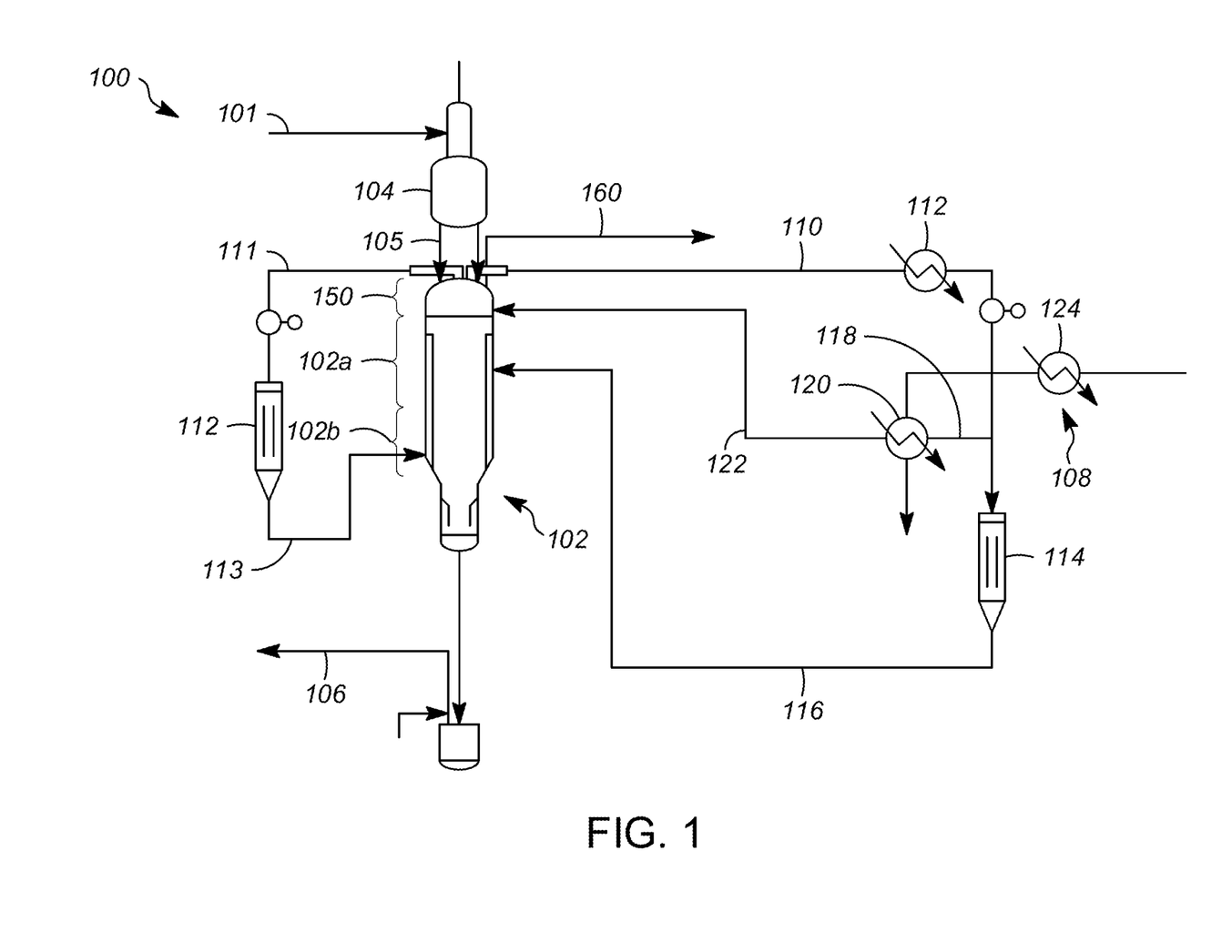
FIG. 1 shows a catalyst regeneration system with a regenerator vessel having an adsorption zone of an embodiment of the instant disclosure.

Referring to FIG. 1, a refinery or a petrochemical production facility can include a hydrocarbon conversion unit and a regeneration unit 102. The hydrocarbon conversion unit (not shown) may include at least one hydrocarbon conversion zone, which can include a plurality of reaction zones or sub-zones housed in one or more reactors. Typically, the conversion zones are arranged in a stacked reactor arrangement or in side-by-side reactors. Moving bed reactors are known to those of skill in the art and exemplary moving bed reactors are disclosed in U.S. Pat. No. 4,119,526 (Peters et al.) and U.S. Pat. No. 4,409,095 (Peters). The hydrocarbon conversion zone can be operated at a pressure of about 0-about 6,900 kPa(g) (about 0-about 1,000 psig), desirably about 260-about 620 kPa(g) (about 37-about 90 psig). Generally, the hydrocarbon conversion zone in this embodiment operates at a pressure above about 340 kPa(g) (about 50 psig), such as a pressure of about 280-about 660 kPa(g) (about 40-about 95 psig).

The general path of the catalyst to and from the hydrocarbon conversion unit and the regeneration system 100 begins with the catalyst entering the hydrocarbon conversion unit (not shown), passing through the at least one hydrocarbon conversion zone, and exiting through a lift conduit 101. Subsequently, the catalyst may travel in the lift conduit 101 to a catalyst-disengaging zone 104 of the regeneration system 100. Typically, the catalyst-disengaging zone 104 includes a catalyst-disengaging hopper having an upper portion and a lower portion and contains more than one atmosphere. The upper portion may be atmospheric. Another atmosphere present in the catalyst-disengaging hopper can contain an inert gas buffer. Afterwards, the catalyst can pass through at least one catalyst transfer line 105 to a regenerator vessel 102. Any suitable regenerator vessel 102 can be utilized, such as those disclosed in U.S. Pat. No. 6,034,018 (Sechrist et al.) and U.S. Pat. No. 5,824,619 (Sechrist et al.). Afterwards, the catalyst can pass through the regeneration vessel 102 and through a lift conduit 106 back to the hydrocarbon conversion zone.

Typically, one or more gases, such as air and/or nitrogen, is provided to the regeneration vessel 102 for utilization in the combustion zone 102a. The combustion zone 102a generally contains one or more combustion gases. These one or more gases traveling through the at least one of the lines 110 and 116 can be referred to as a flue gas or recycle combustion gas. Generally, the flue gas and the recycle combustion gas can include up to about 1%, by volume, oxygen, and other gases that can include nitrogen, carbon dioxide, water, and chlorides, such as hydrogen chloride. Typically, the recycle combustion gas can travel through the line 110, optionally to a recycle compressor, and be cooled in an exchanger 112, and then pass through a line 116. As used herein, the term "compressor" generally means a device for transferring a fluid, especially a gas, and can include a device such as a compressor, a blower, or a fan. Desirably, the exchanger 112, 114, 120, 124, and those described hereinafter whether heating or cooling, are, respectively, indirect heat exchangers utilizing any suitable medium such as air, water, or steam. In the depicted embodiment, air introduced from the discharge of a compressor (not shown) can cool the recycle combustion gas. Subsequently, the cooled recycle combustion gas can pass through a heater 114 and then through a line 116 back into the combustion zone 102a. The cooler 112 and the heater 114 may provide control of the temperature, and hence the rate of combustion, in the zone 102a. Moreover, the heater 114 can be, independently, any suitable heater, including an electric heater, a furnace, or a heat exchanger.

The combustion zone 102a can have a halogen-containing material, such as chlorides, present in a gas that is desirably removed before the gas is discharged to the atmosphere.

A portion of the vent gas passes through conduit 118 and subsequently cooled in an exchanger or cooler 120. Generally, the exchanger 120 is cooled with any suitable cooling fluid, such as air or water. In one exemplary embodiment, air from a compressor can be utilized as the cooling fluid.

The cooled vent gas then can proceed through a line 122 to the adsorption zone 150, which is integrated into the regenerator vessel 102. The flue gas 122 passes through the adsorption zone 150 and halogen-containing material, such as chlorides, are adsorbed onto the catalyst before exiting through a line 160 and a valve (not shown) to be discharged to the atmosphere. The adsorption zone 150 is incorporated into the regeneration vessel 102 and resides in an annular region 151 (see FIG. 3) above the combustion zone 102a.

The flue gas 110 exiting the combustion zone 102a can be at about 480-about 540° C. (about 900-about 1000° F.). The flue/vent gas that may enter the adsorption zone is generally about less than 300° Celsius, preferably about 150-about 200° Celsius. Generally, the adsorption conditions are disclosed in U.S. Pat. No. 6,034,018 (Sechrist et al.). Typically, the total chloride removal in the flue gas stream greater than about 50% and up to about 99%, by mole, of the amount of chloride at the inlet. The concentration of halogen-containing material (such as chlorides or HCl) in the flue gas stream can be reduced to about 1 to about 1000 mol-ppm. If the halogen-containing material is still present (after adsorption) at levels unacceptable for release to the atmosphere, any conventional means, such as chloride scrubbers, can be utilized for removing such material from the flue gas.

This invention is unique in comparison to prior art because adsorption zone is completely contained within the regeneration tower top head. Also, this solution does not require modification to other existing vessels or addition of new ones which makes it an attractive revamp solution for customers.

Because of the unique design of this invention, a new regeneration tower top head can be provided as a retrofit piece of equipment, which attaches to the existing regeneration tower. Some other on-site revamp work will need to be performed but required onsite installation work is substantially reduced for this invention compared to prior art.

Unlike other existing revamp halogen adsorption solutions, this solution does not require new plot space and requires minimal structural modification. Because the adsorption zone 150 is contained within the regeneration tower 102, in general a hot zone where temperatures will be above dew point, risk of condensation or corrosion is reduced.

Figure 2:
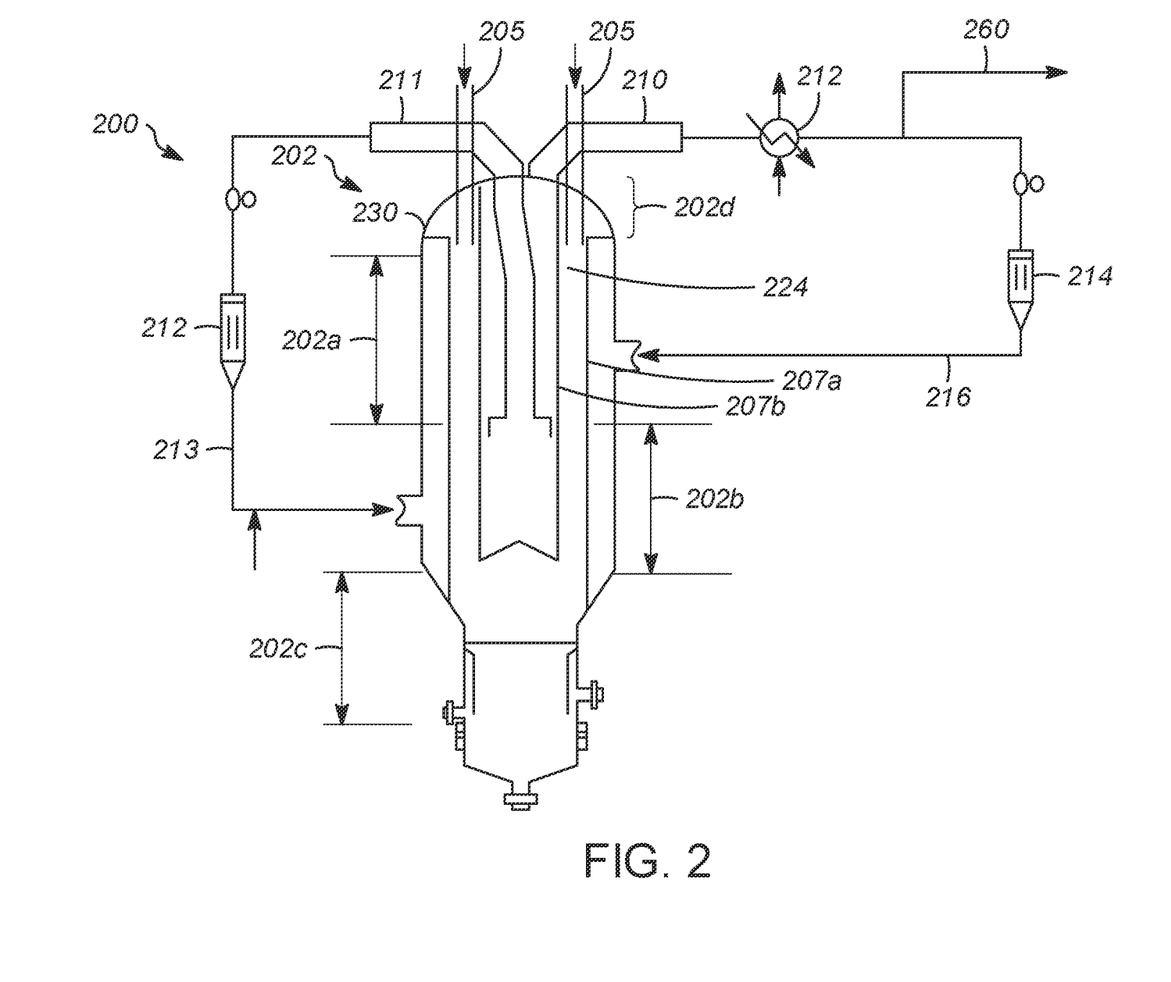
FIG. 2 shows a regeneration system in need of an adsorption system retrofit.

FIG. 2 shows a regenerator system 200 in need of an adsorption zone retrofit. The regenerator vessel 202 has a top head 230 that is domed portion 202d. The regenerator burn zone 202a produces flue gas 210 that is cooled 212 prior to venting to the atmosphere 260. The majority of the flue gas 210 is heated 214 and returned to the burn zone 202a of the regenerator vessel 202. The chlorination zone of the regenerator 202b is disposed below the combustion zone 202a, and the drying zone 202c is disposed below the chlorination zone. The chlorination zone outlet gas 211 is heated 212 and returned 213 to the chlorination zone 202b. Catalyst chutes 205 introduce catalyst into an annular catalyst bed 224 disposed between an outer screen 207a and an inner screen 207b.

Removal of the top head 230 and installation of an adsorption zone is explained in further detail below. Including the Chlorsorb™ process within the regeneration tower top head allows the customer to simply remove the old top head and replace with a new one which already has the chloride adsorption zone contained within the new top head. Removal of the top head is a simple maintenance activity that refineries are accustomed to, as such maintenance must be done each time the inner screen is cleaned on a regular basis.

Minimal modifications need to be made to the remainder of the existing tower itself; this invention fits up with the existing tower in the same way a new flange can bolt to an existing one. The performance of the remainder of the regeneration tower (burn zone, chlorination zone, etc.) is not affected by this design. Since other existing vessels (i.e., disengaging hopper) require no modification, structural design changes are minimal. The simplicity of installation results in lower maintenance and turnaround time, as well as installation time and shutdown time, and therefore reduces cost for the customer and increases production.

The System for Adsorbing Halogen-Containing Material

Figure 3:
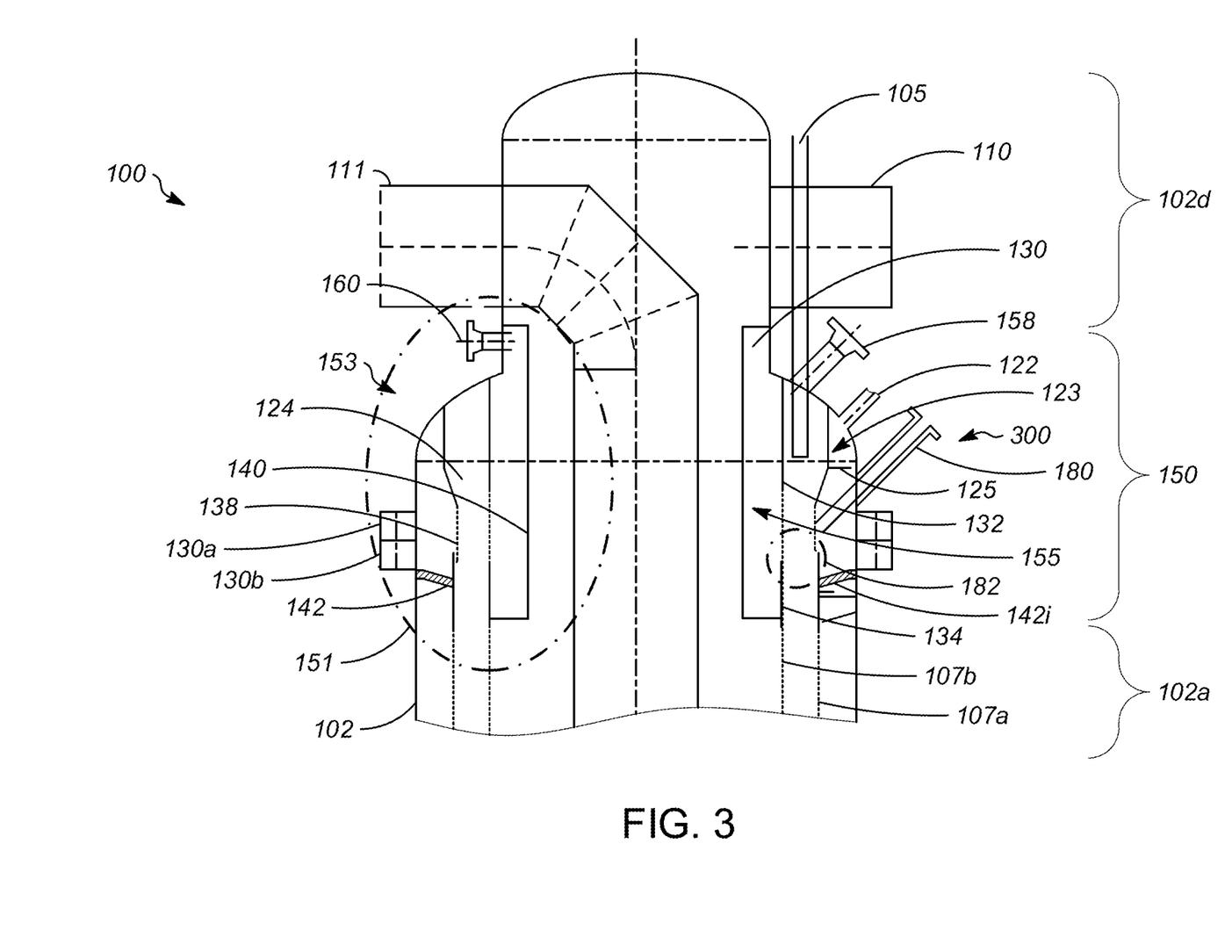
FIG. 3 shows a detailed view of the head section of a regenerator vessel having an adsorption zone according to an embodiment of the instant disclosure.

As shown in FIGS. 1 and 3, an embodiment of the regeneration tower top head adsorption zone 150 is shown. The chloride adsorption zone 150 is located directly above the existing burn zone 102a, with a seal and buffer zone separating it from the burn zone physically, thermally, and hydraulically. The regeneration tower top head is stretched upward to make room for the additional zone, but existing elevations of connected piping (catalyst transfer pipes 105, combustion zone outlet 110, and chlorination zone outlet 111) remain the same to minimize changes to existing piping. Vent gas, cooled by an external vent gas cooler 120, enters the top head via one or more nozzles 122 into a vent gas inlet zone 123. Then the gas flows through the adsorption zone 150, treating the vent gas to remove halogen-containing materials (such as HCl) while also depositing chlorides onto a top portion of the annular catalyst bed 124 at the top of the burn zone 102a. The vent gas exits the chloride adsorption zone 150 via one or more outlet nozzles 160 on the top head 102d (see FIG. 3). Since the new vent gas inlet nozzles 122 and outlet nozzles 160 are disposed on the top head, changes to the remainder of the regenerator are minimized (see FIG. 2).

In order to attain optimal chloride adsorption, the temperature of the annular catalyst bed 124 should be maintained within adsorption temperature zone, <300° C., while located inside a vessel that mostly operates at a higher temperature (500+° C.). This regenerator top head portion 153 includes the following features to maintain this critical temperature window for chloride adsorption (see FIG. 3).

First, the vent gas inlet zone 123 is located at the regen tower shell inner diameter, as far away from the center of the regenerator as possible. In addition, the catalyst bed 124 separates the vent gas inlet zone 123 from the inside of the (warmer) regenerator 102b. This will ensure the cooler temperature of the vent gas inlet 122 is maintained prior to catalyst contact Also, insulation 142i is shown on the blank-off 142 located at a lower hot wall below the vent gas inlet zone 123. Insulation is provided on the hot walls surrounding the vent gas inlet zone and catalyst bed to reduce heat transfer from the combustion zone 102a of the regeneration tower to the adsorption zone 150. A purge gas inlet 158 is provided to introduce an inert gas, preferably nitrogen, into the top of the catalyst bed 124. Due to the variations in temperature of the catalyst entering the regenerator, which can depend on environmental conditions, the nitrogen purge is free of water vapor, which may otherwise condense on the catalyst transfer piping 105 or other surfaces above the catalyst bed. In certain embodiments, the top of the catalyst bed 124 is within the inlet chamber 123. In the illustrated embodiment, the regenerator is made of a corrosion-resistant alloy, such as Inconel™, and aqueous chloride environment is to be avoided.

In the illustrated embodiment, the catalyst bed 124 is a typical platforming reactor catalyst. Generally, such hydrocarbon processes utilize catalyst, which typically contain a metal, such as a noble Group VIII metal, and a halogen, such as chlorine or fluorine. However, catalytic reforming can be a widely practiced hydrocarbon conversion process that uses catalyst regeneration. Reforming catalysts typically contain chlorine. An exemplary catalytic reforming process is described in U.S. Pat. No. 5,837,636 (Sechrist et al.). The catalyst, which is often in particulate form, may include an alumina, such as an activated alumina, a silica alumina, a molecular sieve, or an alumina-silicate clay. An alumina-silicate clay may include a kaolin, an attapulgite, a sepiolite, a polygarskite, a bentonite, or a montmorillonite, particularly when the clays have not been washed by acid to remove substantial quantities of alumina. Such catalysts are disclosed in U.S. Pat. No. 6,034,018 (Sechrist et al.).

FIG. 3 shows a detailed view of the adsorption zone of the regenerator vessel 102. A device or distributor 125 near the vent gas inlet 122 may be used to ensure even distribution of the vent gas as it enters the inlet chamber 123. Similarly, an orifice plate (not shown) near the vent gas outlet 160 may be used to aid better distribution of gas throughout the catalyst bed. These features will ensure good vent gas/catalyst contact for the entire bed and sufficient adsorption performance (see FIG. 3).

In order to fit the chloride adsorption bed into the regeneration tower top head, inlet vapor chamber 123 and outlet vapor chamber 155 are provided within the top head in order to route the gas through the catalyst bed 124 and keep it separate from the other gases in the regeneration tower 102 (such as the burn zone loop, chlorination zone loop).

The chamber 155 for the vent gas outlet 160 is designed to have an annular cross-section in order to prevent interference with the combustion zone outlet 110 and chlorination zone outlet 111 (see FIG. 3). Inlet 122 and outlet 160 nozzles for the vent gas and a catalyst sampling device 180 are provided in a location where there is limited room.

Addition of a new adsorption zone 150 within a regeneration tower can be challenging from a hydraulic perspective. The burn zone gas 116 and vent gas inlet 122 flows are engineered to obtain downward flow of vent gas through the seal zone, which prevents excessive temperatures in the chloride adsorption zone 150 from combustion zone 102a gas contact. Comprehensive Computational Fluid Dynamic modeling is used to ensure burn zone flow 116 does not leak upwards into the chloride adsorption zone 150. This design includes the following features to minimize risk of upward burn zone flow leakage.

First, increasing pressure drop between burn zone heater 114 and adsorption zone 150—either by imposing additional delta P on outer screen 107a or burn zone inlet line 116, or changing shape of catalyst bed 124 to increase delta P between chloride adsorption bed 150 and burn zone catalyst bed.

Second, decreasing vent gas cooler 120 pressure drop, causing downward flow of excess vent gas through the seal zone when vent gas inlet 122 flow rate is greater than vent gas outlet 160 flow rate.

The design for adsorption bed configurations can vary by providing inlet screen and outlet screens 140 having varying dimensions and varying elevations. FIGS. 4a-4d show notable flow patterns of the vent gas in relation to the annular catalyst bed 124, which flows downward.

Figure 4A:
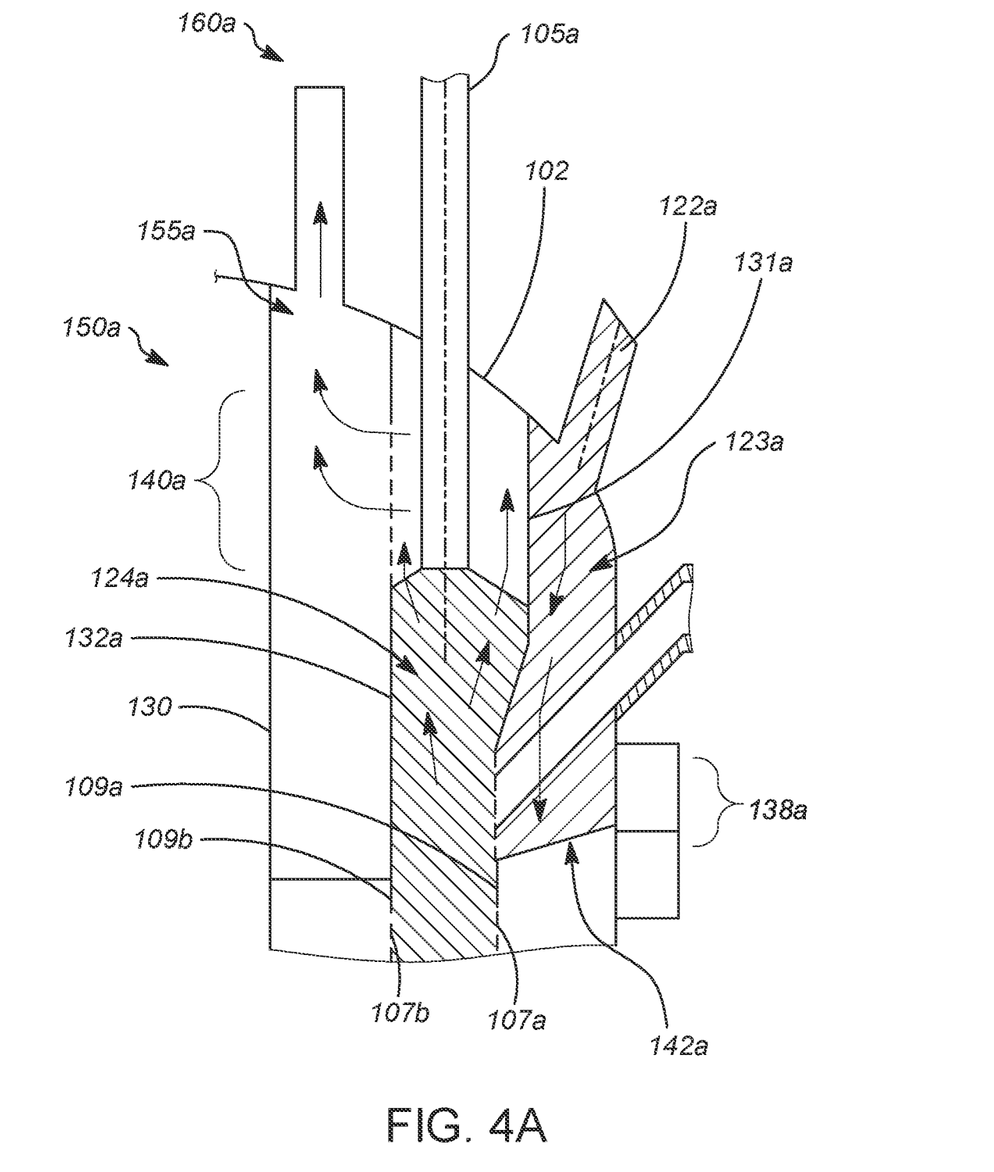
FIG. 4a an embodiment of the present disclosure, wherein the flow of vent gas through the adsorption zone is counter-current with respect to the downward flow of catalyst.

FIG. 4a shows counter-current adsorption zone 150a as the vent gas 122a enters the inlet zone 123a, flows through a portion of the catalyst bed 124a, enters the outlet chamber 155a, and exits through vent gas outlet 160a. In this design, vent gas enters via the vent gas inlet 122a into the inlet chamber 123a and encounters a blank-off 142a. The vent gas then flows into the catalyst bed 124a and upward through an annular catalyst bed 124a between outer baffle 131a and inner baffle 132a with entry and exit points, using multiple screens and/or solid plates with perforations and/or holes (outer surface 138a and inner surface 140a) to route the vent gas properly.

Figure 4B:
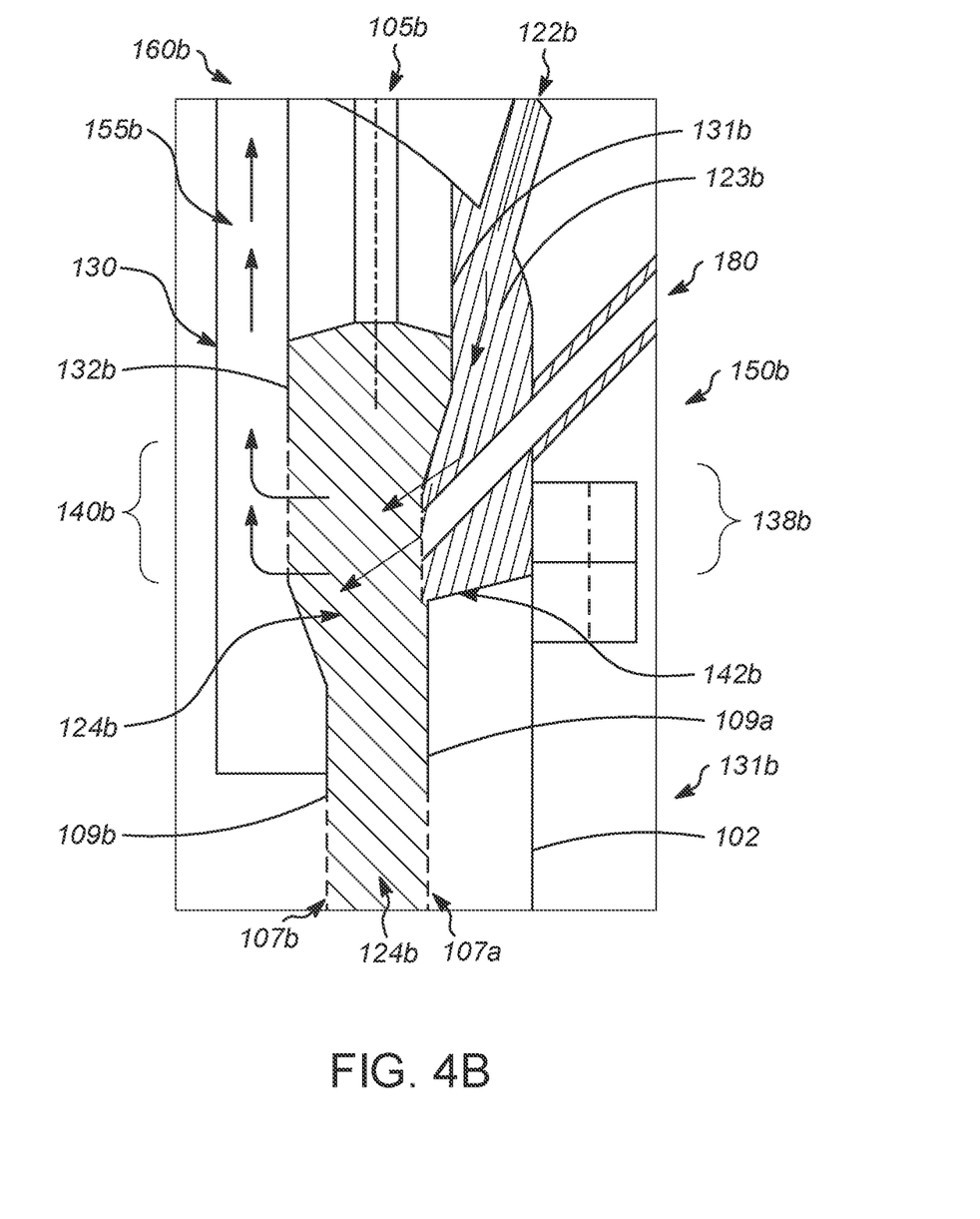
FIG. 4b an embodiment of the present disclosure, wherein the flow of vent gas through the adsorption zone is cross-current with respect to the downward flow of catalyst.

FIG. 4b shows a cross-current adsorption zone 150b. Contact between the vent gas 122b flowing radially inward from the inlet chamber 123b, through the catalyst bed 124b, into the outlet chamber 155b, and out through vent gas outlet 160b. In this design, an outer screen 138b and inner screen 140b and/or louvers are used to create a cross-current, radial flow. Although the illustrated embodiment shows radially inward flow, the cross-current flow may be inward or outward.

Figure 4C:
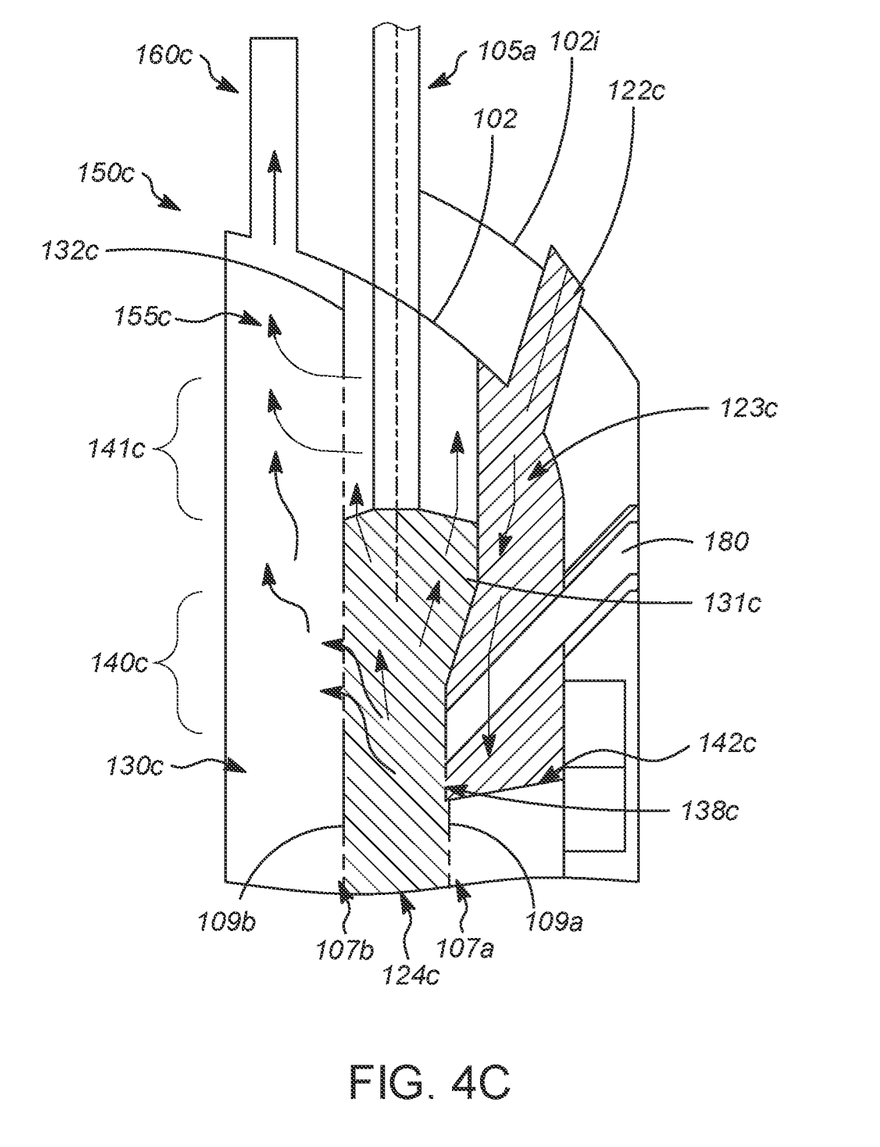
FIG. 4c an embodiment of the present disclosure, wherein the flow of vent gas through the adsorption zone is a combination of counter-current and cross-current with respect to the downward flow of catalyst.

FIG. 4c shows an adsorption zone 150c, which utilizes a combination of cross-current and counter-current contact between the vent gas 122c. The vent gas enters the inlet chamber 123c, flows through a portion of the catalyst bed 124c, into the outlet chamber 155c, and out through outlet 160c. In this design, baffles, and screens and/or louvers are utilized to contain the catalyst bed and route the gas through it. The vent gas takes a cross-current flow path from the inlet screen 138c toward the lower outlet screen 140c. A portion of the vent gas takes a counter-current flow path from the inlet screen 138c upward, against the flow of the annular catalyst bed 124c, toward the upper outlet screen 141c.

Figure 4D:
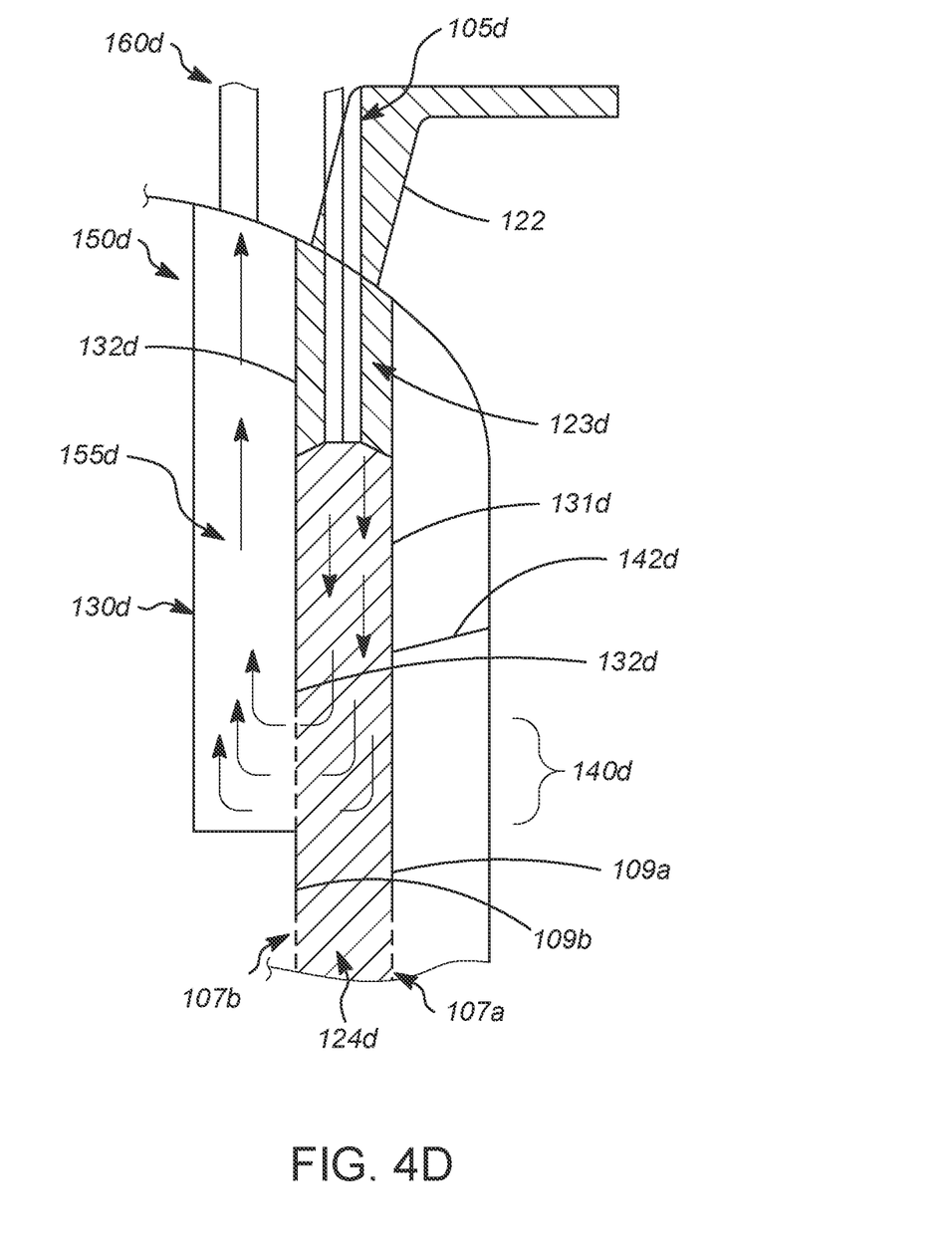
FIG. 4d an embodiment of the present disclosure, wherein the flow of vent gas through the adsorption zone is co-current with respect to the downward flow of catalyst.

FIG. 4d shows a co-current adsorption zone 150d. Contact between the vent gas 122d and catalyst bed 124d occurs in the downward flow path. In this design, gas flows downward through an annular catalyst bed 124d between outer baffle 131d and inner baffle 132d. The inner baffle 132d having a screen or louver portion 140d in the lower portion. The vent gas 123d flows out of the catalyst bed 124d, into the outlet chamber 155d, and upward out of the vent gas outlet 160d.

Different vent gas flow regimes exist as the vent gas passes through the annular catalyst bed.

Retrofit Process

The method of retrofitting the head portion 230 of a regenerator vessel 202 (see FIG. 2) to having an integrated adsorption zone 150 (shown in FIG. 3) begins with decommissioning the regenerator system. A portion of the catalyst inside the regenerator is removed. Next, piping associated with existing top head, such as the chlorination zone outlet, burn zone outlet, catalyst transfer piping, is disconnected. The top head, inner screens and the chlorination outlet hood assembly are removed from the existing top head.

If the existing inner screen is to be re-used, it is cut it from the existing top head and then attached to a fit-up ring on the inner screen blank-off 109b attached to the new top head. The outer screen blank-off 109a is an annular component that is attached to the annular screen 107a near the bottom portion of the adsorption zone 150. The inner screen blank-off 109b is an annular component that is attached to the annular screen 107b near the bottom portion of the adsorption zone 150. Gaps are provided between the outer screen 138 and the outer screen blank-off 109a to allow for independent thermal expansion of the annular screen 107a and the components that define the adsorption zone 150. Mesh connecting the top of outer screen and the regeneration tower shell may be replaced with thin solid plate 142. The new top head 153, inner screen, chlorination outlet hood assembly are installed by bolting large body flanges 130a, 130b together.

The new pieces of equipment, such as the vent gas inlet 122 and vent gas outlet lines 160, the vent gas cooler 120, and the air preheater 114, are connected to the new regenerator top head. The catalyst is then reloaded into the regenerator vessel.

Catalyst Sampling System

Figure 5A:
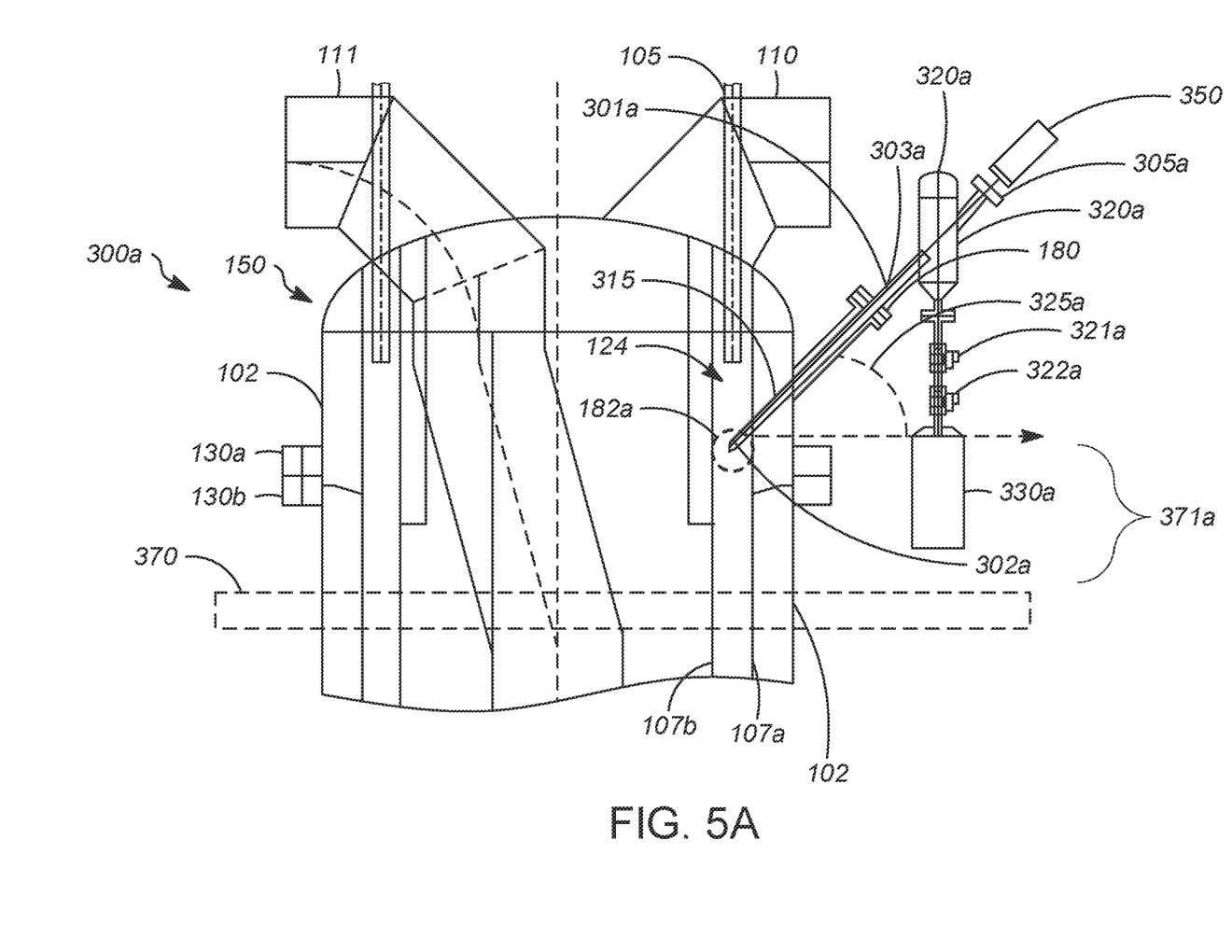
FIG. 5a shows a first embodiment of a catalyst sampling system for an adsorption zone of the present disclosure.

Attaining catalyst samples directly downstream of the chloride adsorption zone 150 is critical to assessing the performance of the adsorption zone per environmental regulations. Conventional gravity-flow catalyst sampling systems present two challenges. Either the lower part of the regeneration tower shell and internals, including outer screen (existing) would have to be modified to allow this type of catalyst sample device to be utilized, or the space required for the device to keep it part of the new top head assembly yet also above existing structure 370 would result in extremely limited height in which to add the chloride adsorption zone.

This disclosure details a novel design utilizing screw conveyor, thief, eductor or other alternative to downward gravity flow devices to allow for an inverted catalyst sample that could be fitted above the sample point in the catalyst bed. Having a positively inclined sample system rather than a negatively sloped gravity flow sample saves a significant amount of space around the catalyst bed of the regeneration tower. For a retrofit project that proposed adding an adsorption zone in the top head of an atmospheric Continuous Catalyst Regeneration (CCR) Tower, approximately 0.5 m of additional height would be needed to fit the traditional gravity flow sample. In many cases, that additional height is not practical and would be a showstopper for the design if the gravity sample were used. Furthermore, since with the gravity sample the additional height must come below the adsorption zone bed, the additional bed height is not utilized for any process function. Alternatively, the inverted screw conveyor sample mechanism allows for a sample to be taken with minimal additional height required for the catalyst bed, less than 0.2 m, which can all be utilized for the Chlorsorb™ process. Such a retrofit is beneficial to add the adsorption zone 150 to an existing catalyst regenerator vessel 202.

Figure 5B:
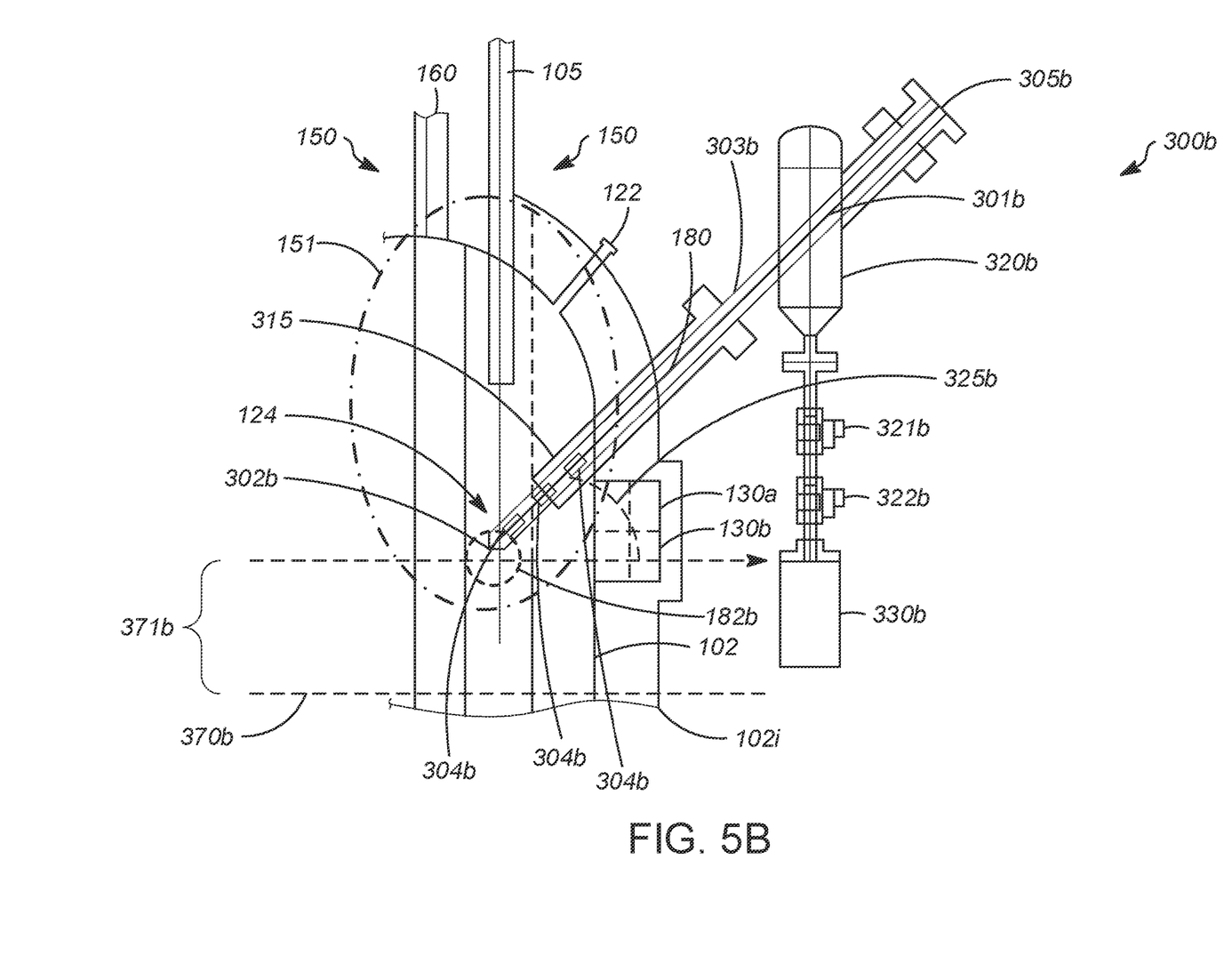
FIG. 5b shows a second embodiment of a catalyst sampling system for an adsorption zone of the present disclosure.

This sampling apparatuses 300a, 300b are used to transport the catalyst from the sample point 182a, 182b in the annular catalyst bed 124 to a collection hopper where the catalyst can be removed for analysis. The screw conveyor or thief is inserted in a lance 315 that passes through a nozzle 180 in the regenerator vessel 102 and insulation 102i. The distal end of the screw conveyor or thief preferably has a tip that is inserted directly into the catalyst bed 124.

The screw conveyor or thief, lance, and nozzle are located at a positive angle, typically 45 degrees, from horizontal. The screw conveyor or thief terminates in a small collection hopper, similar to the one typically used for gravity flow collection. The drive shaft or rod of the screw conveyor or elongate portion of the thief passes through the hopper vessel where there is an external method for turning the shaft 350. This method could be a manual handle or a motor 350. When it is time to take the catalyst sample, the shaft is turned (either manually or automatically) a precalculated number of turns required to achieve the required volume of catalyst within the hopper. Then a series of valves 321a, 322a are used below the hopper to collect the catalyst without opening the regeneration system to the atmosphere.

In order to measure compliance with environmental regulations, upward-pulling catalyst sampling devices 300a, 300b are shown in FIGS. 5a and 5b. The upward pulling solutions in the illustrated embodiments include a screw conveyor, a thief (hollow, slotted tube-within-a-tube design allowing insertion into and removal of a granular bed), and an eductor style.

The screw conveyor comprises a shaft with a rotating helical screw blade (detail of flighting not shown) within a tube, lance, or sheath 315. The distal end of the screw forms a tip 302a that is disposed at the sample point 182a within the catalyst bed 124. The screw conveyor comprises a motor 350 and a screw 301a that extends through a sample port nozzle 180 into the annular catalyst bed 124. Below the collection hopper 303a are two ball valves 321a, 322a that allow catalyst to fall into a sample container 330. The sample nozzle 180 and the screw conveyor are disposed at an angle 325a of about 45 degrees with respect to horizontal and about 45 degrees from the vertical side wall of the regenerator vessel 102. The sample point 182a must be at an elevation that is lower than the adsorption zone 105. The existing structure 370 is shown is an impediment to gravity-based sampling methods.

The thief sampling apparatus comprises an elongate member 303b having a plurality of cavities 304b that are inserted into the catalyst bed and turned to collect catalyst in one or more of the plurality of cavities 304b. The elongate member 303b has a tip provided at a distal end 302b and is pulled upward from a proximate end 305b and turned to drop catalyst from the plurality of cavities 304b into the collection hopper 320b. Ball valves 321b, 322b are provided to isolate the process from the sample bottle 330b.

The elongate member 303b has a longitudinal axis 301b that is disposed at an angle 325b of about 45 degrees with respect to horizontal and about 45 degrees from the vertical side wall of the regenerator vessel 102.

A further contemplated embodiment is an eductor system that uses nitrogen as a motive fluid to draw a catalyst sample out of the annular catalyst bed and into a collection hopper. While the eductor may introduce hydraulic effects to the system, piping could be modified to fit the eductor into the limited space provided in a retrofit regenerator system.

Specific Embodiments

While the following is described in conjunction with specific embodiments, it will be understood that this description is intended to illustrate and not limit the scope of the preceding description and the appended claims.

A first embodiment of the invention is an apparatus for adsorbing halogen-containing material from a regenerator vent gas stream, the regenerator vessel comprising a plurality of catalyst nozzles disposed at a top portion of the regenerator vessel; a first gas outlet associated with a chlorination zone; a second gas outlet associated with a combustion zone; and a drying zone in fluid communication with an air heater, the drying zone located in a bottom portion of the regenerator vessel; wherein the first gas outlet is configured to withdraw a first gas stream from the chlorination zone; wherein the second gas outlet is configured to withdraw a second gas stream from the combustion zone; wherein the top portion of the regenerator vessel comprises an adsorption zone having a vent gas inlet port and a vent gas outlet port, the adsorption zone comprising a portion of an annular catalyst bed. An embodiment of the invention is one, any or all of prior embodiments in this paragraph up through the first embodiment in this paragraph, wherein the vent gas inlet port is disposed at a position in the top portion of the regenerator vessel that is radially outward of the vent gas outlet port. An embodiment of the invention is one, any or all of prior embodiments in this paragraph up through the first embodiment in this paragraph, wherein the vent gas inlet port is disposed at a position in the top portion of the regenerator vessel having a lower elevation than the vent gas outlet port. An embodiment of the invention is one, any or all of prior embodiments in this paragraph up through the first embodiment in this paragraph, wherein the regenerator vessel comprises a chloride adsorption zone above the combustion zone. An embodiment of the invention is one, any or all of prior embodiments in this paragraph up through the first embodiment in this paragraph, wherein the regenerator vessel comprises a sample port disposed at a lower elevation that the plurality of catalyst ports and the vent gas inlet port. An embodiment of the invention is one, any or all of prior embodiments in this paragraph up through the first embodiment in this paragraph, wherein the regenerator vessel comprises an annular outer baffle and an annular inner baffle disposed in the top portion of the regenerator vessel. An embodiment of the invention is one, any or all of prior embodiments in this paragraph up through the first embodiment in this paragraph, wherein the annular outer baffle comprises a vent gas inlet screen, and wherein the annular inner baffle comprises a vent gas outlet screen. An embodiment of the invention is one, any or all of prior embodiments in this paragraph up through the first embodiment in this paragraph, wherein the adsorption zone is configured to provide a vent gas flow in relation to a catalyst bed direction that is co-current, counter-current, cross-current, or a combination thereof. An embodiment of the invention is one, any or all of prior embodiments in this paragraph up through the first embodiment in this paragraph, wherein sample port is disposed at an angle of about 45 degrees with respect to a vertical outer wall of the regenerator vessel.

A second embodiment of the invention is a process for regenerating catalyst in a regenerator vessel, the process comprising providing the regenerator vessel comprising a plurality of catalyst nozzles disposed at a top portion of the regenerator vessel; a first gas outlet associated with a chlorination zone; a second gas outlet associated with a combustion zone; and a drying zone in fluid communication with an air heater located in a bottom portion of the regenerator vessel; wherein the first gas outlet is configured to withdraw a first gas stream from the chlorination zone; wherein the second gas outlet is configured to withdraw a second gas stream from the combustion zone; withdrawing a portion of the second gas stream to form a regenerator vent gas stream; introducing the regenerator vent gas stream to the top portion of the regenerator vessel at a vent gas inlet port; contacting the regenerator vent gas stream with catalyst in the top portion of the regenerator vessel; withdrawing a treated regenerator vent gas stream from the top portion of the regenerator vessel at a vent gas outlet port; and discharging the treated regenerator vent gas stream to the atmosphere. An embodiment of the invention is one, any or all of prior embodiments in this paragraph up through the second embodiment in this paragraph, wherein the contacting occurs at a temperature of between about 100 and about 300 degrees Celsius, and wherein at least about 50% of halogen-containing material present in the regenerator vent gas stream is adsorbed onto the catalyst. An embodiment of the invention is one, any or all of prior embodiments in this paragraph up through the second embodiment in this paragraph, further comprising sampling the catalyst at an elevation below the vent gas inlet port; and wherein the step of contacting the regenerator vent gas stream with catalyst in the top portion of the regenerator vessel comprises a vent gas flow in relation to a catalyst bed direction that is co-current, counter-current, cross-current, or a combination thereof. An embodiment of the invention is one, any or all of prior embodiments in this paragraph up through the second embodiment in this paragraph, wherein the sampling comprises operating a screw conveyor to withdraw catalyst upward from a chloride adsorption zone of the regenerator vessel. An embodiment of the invention is one, any or all of prior embodiments in this paragraph up through the second embodiment in this paragraph, wherein the sampling comprises operating a thief sampling apparatus to withdraw catalyst upward from a chloride adsorption zone of the regenerator vessel, the thief sampling apparatus comprising an elongate member having a plurality of cavities. An embodiment of the invention is one, any or all of prior embodiments in this paragraph up through the second embodiment in this paragraph, wherein the sampling comprises operating an eductor sampling apparatus to withdraw catalyst upward from a chloride adsorption zone of the regenerator vessel.

A third embodiment of the invention is a method of retrofitting a head portion of a regenerator vessel, the method comprising unloading catalyst from the regenerator vessel; disconnecting piping associated with the head portion, the piping comprising a chlorination zone outlet, a burn zone outlet, and catalyst transfer piping; removing the head portion and a portion of an inner screen; installing a new head portion having a vent gas inlet port, a vent gas outlet port, an annular outer baffle, and an annular inner baffle; connecting a vent gas inlet line, a vent gas outlet line, a vent gas cooler, an air preheater, to the new head portion; and reloading catalyst into the regenerator vessel. An embodiment of the invention is one, any or all of prior embodiments in this paragraph up through the third embodiment in this paragraph, further comprising the step of installing a sample port in the new head portion of the regenerator vessel, the sample port disposed radially outward and at a lower elevation with respect to the vent gas inlet port. An embodiment of the invention is one, any or all of prior embodiments in this paragraph up through the third embodiment in this paragraph, further comprising the step of attaching the annular inner baffle to an annular inner screen and attaching the annular outer baffle to an annular outer screen. An embodiment of the invention is one, any or all of prior embodiments in this paragraph up through the third embodiment in this paragraph, further comprising the step of installing a purge gas inlet in the new head portion of the regenerator vessel. An embodiment of the invention is one, any or all of prior embodiments in this paragraph up through the third embodiment in this paragraph, further comprising the step of installing a vent gas inlet screen in the annular outer baffle and installing a vent gas outlet screen in the annular inner baffle. An embodiment of the invention is one, any or all of prior embodiments in this paragraph up through the third embodiment in this paragraph, further comprising the step of installing a vent gas inlet screen in the annular outer baffle and installing a vent gas outlet screen in the annular inner baffle.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least two exemplary embodiments have been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A regenerator vessel for adsorbing halogen-containing material from a regenerator vent gas stream, the regenerator vessel comprising:
    a plurality of catalyst nozzles disposed at a top portion of the regenerator vessel;
    a first gas outlet associated with a chlorination zone;
    a second gas outlet associated with a combustion zone; and
    a drying zone in fluid communication with an air heater, the drying zone located in a bottom portion of the regenerator vessel;
    wherein the first gas outlet is configured to withdraw a first gas stream from the chlorination zone;
    wherein the second gas outlet is configured to withdraw a second gas stream from the combustion zone;
    wherein the top portion of the regenerator vessel comprises an adsorption zone having a vent gas inlet port and a vent gas outlet port, the adsorption zone comprising a portion of an annular catalyst bed.

2. The regenerator vessel of claim 1, wherein the vent gas inlet port is disposed at a position in the top portion of the regenerator vessel that is radially outward of the vent gas outlet port.

3. The regenerator vessel of claim 1, wherein the vent gas inlet port is disposed at a position in the top portion of the regenerator vessel having a lower elevation than the vent gas outlet port.

4. The regenerator vessel of claim 1, wherein the adsorption zone comprises an inlet chamber and an outlet chamber.

5. The regenerator vessel of claim 1, wherein the regenerator vessel comprises a sample port disposed at a lower elevation that the plurality of catalyst ports and the vent gas inlet port.

6. The regenerator vessel of claim 5, wherein the sample port is disposed at an angle of about 45 degrees with respect to a vertical outer wall of the regenerator vessel.

7. The regenerator vessel of claim 1, wherein the regenerator vessel comprises an annular outer baffle and an annular inner baffle disposed in the top portion of the regenerator vessel.

8. The regenerator vessel of claim 7, wherein the annular outer baffle comprises a vent gas inlet screen, and wherein the annular inner baffle comprises a vent gas outlet screen.

9. The regenerator vessel of claim 1, wherein the adsorption zone is configured to provide a vent gas flow in relation to a catalyst bed direction that is co-current.

10. A process for regenerating catalyst in a regenerator vessel, the process comprising:
    providing the regenerator vessel comprising:
        a plurality of catalyst nozzles disposed at a top portion of the regenerator vessel;
        a first gas outlet associated with a chlorination zone;
        a second gas outlet associated with a combustion zone; and
        a drying zone in fluid communication with an air heater located in a bottom portion of the regenerator vessel;
        wherein the first gas outlet is configured to withdraw a first gas stream from the chlorination zone;
        wherein the second gas outlet is configured to withdraw a second gas stream from the combustion zone;
    withdrawing a portion of the second gas stream to form a regenerator vent gas stream;
    introducing the regenerator vent gas stream to the top portion of the regenerator vessel at a vent gas inlet port;
    contacting the regenerator vent gas stream with catalyst in an adsorption zone disposed in the top portion of the regenerator vessel;
    withdrawing a treated regenerator vent gas stream from the top portion of the regenerator vessel at a vent gas outlet port; and
    discharging the treated regenerator vent gas stream to the atmosphere.

11. The process of claim 10, wherein the contacting occurs at a temperature of between about 100 and about 300 degrees Celsius, and wherein at least about 50% of halogen-containing material present in the regenerator vent gas stream is adsorbed onto the catalyst.

12. The process of claim 10, further comprising sampling the catalyst at an elevation below the vent gas inlet port; and wherein the step of contacting the regenerator vent gas stream with catalyst in the top portion of the regenerator vessel comprises a vent gas flow in relation to a catalyst bed direction that is counter-current or cross-current.

13. The process of claim 12, wherein the sampling comprises operating a screw conveyor to withdraw catalyst upward from the adsorption zone of the regenerator vessel.

14. The process of claim 12, wherein the sampling comprises operating a thief sampling apparatus to withdraw catalyst upward from the adsorption zone of the regenerator vessel, the thief sampling apparatus comprising an elongate member having a plurality of cavities.

15. The process of claim 12, wherein the sampling comprises operating an eductor sampling apparatus to withdraw catalyst upward from the chloride adsorption zone of the regenerator vessel.

16. A method of retrofitting a head portion of a regenerator vessel, the method comprising:
unloading catalyst from the regenerator vessel;
disconnecting piping associated with the head portion, the piping comprising a chlorination zone outlet, a combustion zone outlet, and catalyst transfer piping;
removing the head portion and a portion of an inner screen;
installing a new head portion having a vent gas inlet port, a vent gas outlet port, an annular outer baffle, and an annular inner baffle;
connecting a vent gas inlet line, a vent gas outlet line, a vent gas cooler, an air preheater, to the new head portion; and
reloading catalyst into the regenerator vessel.

17. The method of claim 16, further comprising the step of installing a sample port in the new head portion of the regenerator vessel, the sample port disposed radially outward and at a lower elevation with respect to the vent gas inlet port.

18. The method flow of claim 16, further comprising the step of attaching the annular inner baffle to an annular inner screen and attaching the annular outer baffle to an annular outer screen.

19. The method flow of claim 16, further comprising the step of installing a purge gas inlet in the new head portion of the regenerator vessel.

20. The method flow of claim 16, further comprising the step of installing a vent gas inlet screen in the annular outer baffle and installing a vent gas outlet screen in the annular inner baffle.

* * * * *